United States Patent
Oh et al.

(10) Patent No.: US 12,123,509 B2
(45) Date of Patent: Oct. 22, 2024

(54) SCALE RESISTANT BACKCHECK VALVE

(71) Applicant: Schlumberger Technology Corporation, Sugar Land, TX (US)

(72) Inventors: Shao Chong Oh, Singapore (SG); Pierre Gely, Singapore (SG)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/041,436

(22) PCT Filed: Aug. 18, 2021

(86) PCT No.: PCT/US2021/046409
§ 371 (c)(1),
(2) Date: Feb. 13, 2023

(87) PCT Pub. No.: WO2022/040252
PCT Pub. Date: Feb. 24, 2022

(65) Prior Publication Data
US 2023/0313897 A1    Oct. 5, 2023

Related U.S. Application Data

(60) Provisional application No. 62/706,449, filed on Aug. 18, 2020.

(51) Int. Cl.
*F16K 15/06* (2006.01)
*E21B 43/12* (2006.01)
*F16K 25/00* (2006.01)

(52) U.S. Cl.
CPC .......... *F16K 15/065* (2021.08); *E21B 43/123* (2013.01); *F16K 25/005* (2013.01)

(58) Field of Classification Search
CPC ..... F16K 15/065; F16K 25/005; E21B 43/123
See application file for complete search history.

(56) References Cited

U.S. PATENT DOCUMENTS 2,286,841 A * 6/1942 Smith ................... F16K 15/044
137/539
3,212,517 A * 10/1965 Canalizo ............... E21B 43/123
137/155

(Continued)

FOREIGN PATENT DOCUMENTS

WO    9953170 A1    10/1999

OTHER PUBLICATIONS

MSAS—Master Surface Annulus Safety Valve, downloaded on Mar. 13, 2023 from https://www.ptc.as/solutions/surface-annular-systems/master-surface-annulus-safety-valve-msas (2 pages).

(Continued)

*Primary Examiner* — P. Macade Nichols
(74) *Attorney, Agent, or Firm* — Jeffrey D. Frantz (57) ABSTRACT

A gas lift valve is provided with increased longevity, reliability for preventing backflow, and/or scale resistance. A wide cylindrical sliding member stabilizes axial movement of a valve element in the gas lift valve. A wide spring around the sliding member biases the valve element toward closure during back flow. The spring is physically supported and guided by the sliding member and protected from gas flow injection by the same sliding member. A poppet shape of the valve element provides a consistent closing seal, and the sliding member protects the valve seat and poppet from full force of an injected gas.

20 Claims, 4 Drawing Sheets

(56) References Cited

U.S. PATENT DOCUMENTS

| | | | |
|---|---|---|---|
| 6,446,664 B1* | 9/2002 | Parsons | F16K 25/04 |
| | | | 137/329 |
| 9,273,541 B2 | 3/2016 | Mahmoud | |
| 2003/0084941 A1* | 5/2003 | Fischer | F16K 15/026 |
| | | | 137/541 |
| 2003/0116199 A1* | 6/2003 | Schroeder | F16K 15/065 |
| | | | 137/541 |
| 2015/0083433 A1 | 3/2015 | Long | |
| 2015/0233220 A1 | 8/2015 | Tiong | |
| 2015/0253786 A1 | 9/2015 | Reed | |

OTHER PUBLICATIONS

HSAS—Surface Annulus Safety Valve, downloaded on Mar. 13, 2023 from https://www.ptc.as/solutions/surface-annular-systems/surface-annulus-safety-valve-hsas (2 pages).
International Search Report and Written Opinion issued in the PCT Application PCT/US2021/046409, dated Dec. 7, 2021 (11 pages).

* cited by examiner

SCALE RESISTANT BACKCHECK VALVE

CROSS-REFERENCE TO RELATED APPLICATIONS

Any and all applications for which a foreign or domestic priority claim is identified in the Application Data Sheet as filed with the present application are hereby incorporated by reference under 37 CFR 1.57. The present application is a National Stage Entry of International Application No. PCT/US2021/046409, filed Aug. 18, 2021, which claims priority benefit of U.S. Provisional Application No. 62/706,449, filed Aug. 18, 2020, the entirety of which is incorporated by reference herein and should be considered part of this specification.

BACKGROUND

Field

The present disclosure generally relates to gas lift valves, and more particularly to gas lift valves that are scale resistant.

Description of the Related Art

Gas lift is a process in which a gas is injected from the annulus of a well into the production tubing of the well, to lower the density of oil being recovered, making the fluid easier to lift. The injected gas aerates to lighten the well fluid for flow to the surface. Gas lift valves control the flow of gas during either an intermittent or continuous-flow gas lift operation. A principle of gas lift operation is differential pressure control with a variable orifice size to further constrain the maximum flow rate of gas. By incorporating a hydrostatic pressure chamber that can be charged with different pressures, injection pressure-operated gas lift valves and unloading valves can be configured so that an upper valve in the production string opens before a lower valve opens, even though both valves receive the injection gas from the same annulus. A gas lift valve is either fully open or fully closed, there is no intermediate valve state. Gas lift valves are often retrievable using a kick-off tool in the well. Back check is a critical component for gas lift valves to prevent the well fluid from recirculating back to the annulus of the casing.

SUMMARY

In some configurations, a gas lift valve includes a first port for receiving a gas from a well annulus; a second port for transferring the gas to a well production tube; a valve seat; a poppet valve element for allowing a one-way flow of the gas past the valve seat and for preventing a back flow of the gas; a sliding barrel attached to the poppet valve element to maintain a sealing surface of the poppet valve element in alignment with a sealing surface of the valve seat; and a spring coiled around an outside diameter of the sliding barrel to bias the poppet valve element in a closed position against the valve seat.

The sliding barrel and the spring can have a wide cross-sectional diameter substantially the same as a diameter of the poppet valve element to maintain a sealing interface of the poppet valve element and the valve seat in parallel-planar alignment with each other. The poppet valve element can be or include a one-piece member for alignment of a sealing surface of the poppet valve element with a sealing surface of the valve seat. The spring can be protected from a main flow of the gas by the barrel. A sealing interface between the poppet valve element and the valve seat can be protected from a direct high speed flow of the gas by at least one valve component. A maximum open state of the poppet valve element can be determined by the poppet valve element contacting an end housing of the gas lift valve. The gas lift valve can further include a second valve seat, a second poppet valve element, a second sliding barrel, and a second spring. The gas lift valve can further include a dual radius check positioned in the gas lift valve upstream of the valve seat and poppet valve element. The gas lift valve can include a scale-resistant coating. The second port can be a single outlet hole. The single outlet hole can include radialized edges configured to reduce scale nucleation sites and reduce the likelihood of the second port becoming plugged.

In some configurations, a scale resistant gas lift valve includes a first port for receiving a gas from a well annulus; a second port for transferring the gas to a well production tube, the second port comprising a single outlet hole; a valve seat; a poppet valve element for allowing a one-way flow of the gas past the valve seat and for preventing a back flow of the gas; a sliding barrel attached to the poppet valve element; and a spring coiled around an outside diameter of the sliding barrel to bias the poppet valve element in a closed position against the valve seat.

The scale resistant gas lift valve can further include alignment features configured to maintain a sealing surface of the poppet valve element in alignment with a sealing surface of the valve seat. The alignment features can include a peg having a hexagonal outer cross-sectional shape and a hole having a corresponding hexagonal inner cross-sectional shape, the peg configured to slide within and relative to the hole as the gas lift valve opens and closes in use. The alignment features and the spring can be positioned above the sealing surface of the valve seat.

The single outlet hole can include radialized edges configured to reduce scale nucleation sites and reduce the likelihood of the second port becoming plugged. The scale resistant gas lift valve can include a second valve seat, a second poppet valve element, a second sliding barrel, and a second spring disposed upstream, relative to flow of an injection fluid or gas from the well annulus through the valve to the well production tube, of the valve seat, poppet valve element, sliding barrel, and spring. The scale resistant gas lift valve can include a dual radius check positioned in the gas lift valve upstream, relative to a flow of an injection fluid or gas through the valve from the well annulus to the well production tube, of the valve seat and poppet valve element. The scale resistant gas lift valve can further include a scale resistant coating. The coating can be Teflon-based or diamond-like.

BRIEF DESCRIPTION OF THE FIGURES

Certain embodiments, features, aspects, and advantages of the disclosure will hereafter be described with reference to the accompanying drawings, wherein like reference numerals denote like elements. It should be understood that the accompanying figures illustrate the various implementations described herein and are not meant to limit the scope of various technologies described herein.

DETAILED DESCRIPTION

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. Commonly, these terms relate to a reference point at the surface from which drilling operations are initiated as being the top point and the total depth being the lowest point, wherein the well (e.g., wellbore, borehole) is vertical, horizontal or slanted relative to the surface.

In a gas lift operation, gas is injected from the annulus of a well into the production tubing of the well, to lower the density of oil being recovered, making the fluid easier to lift. One or more gas lift valves control the entry of injection gas from the annulus into the production tubing. Certain wells or conditions in wells, for example, mineral rich wells, can cause scale build-up on gas lift valves. In some cases, chemical treatment can be performed to reduce the occurrence of scale build up. However, in some cases chemical treatment is not a feasible option, for example, older wells and/or wells without the required surface and/or completion equipment for chemical treatment. Gas lift valves clogged with scale can cause flow restrictions and/or valve failures.

The present disclosure advantageously provides systems and methods for gas lift valves that are scale resistant. For example, the present disclosure provides scale resistant backcheck valves. In some well operations, the source of scale minerals is supersaturated production fluid (for example, instead of injection gas). In some well operations, production fluid does not come into contact with the backcheck valve during operation, but does come into contact with the backcheck valve when injection stops. In order to be scale resistant in such conditions, backcheck valves according to the present disclosure can include a check mechanism that is protected from production fluid during shut-ins or when injection is stopped. Gas lift valves according to the present disclosure can have a reduced or minimized surface roughness, and/or can be coated, to reduce scale adhesion. In some configurations, gas lift valves can be designed to increase flow velocity and wall shear stress to facilitate scale removal. Small holes that could be plugged easily can be reduced, minimized, or eliminated.

Figure 1:
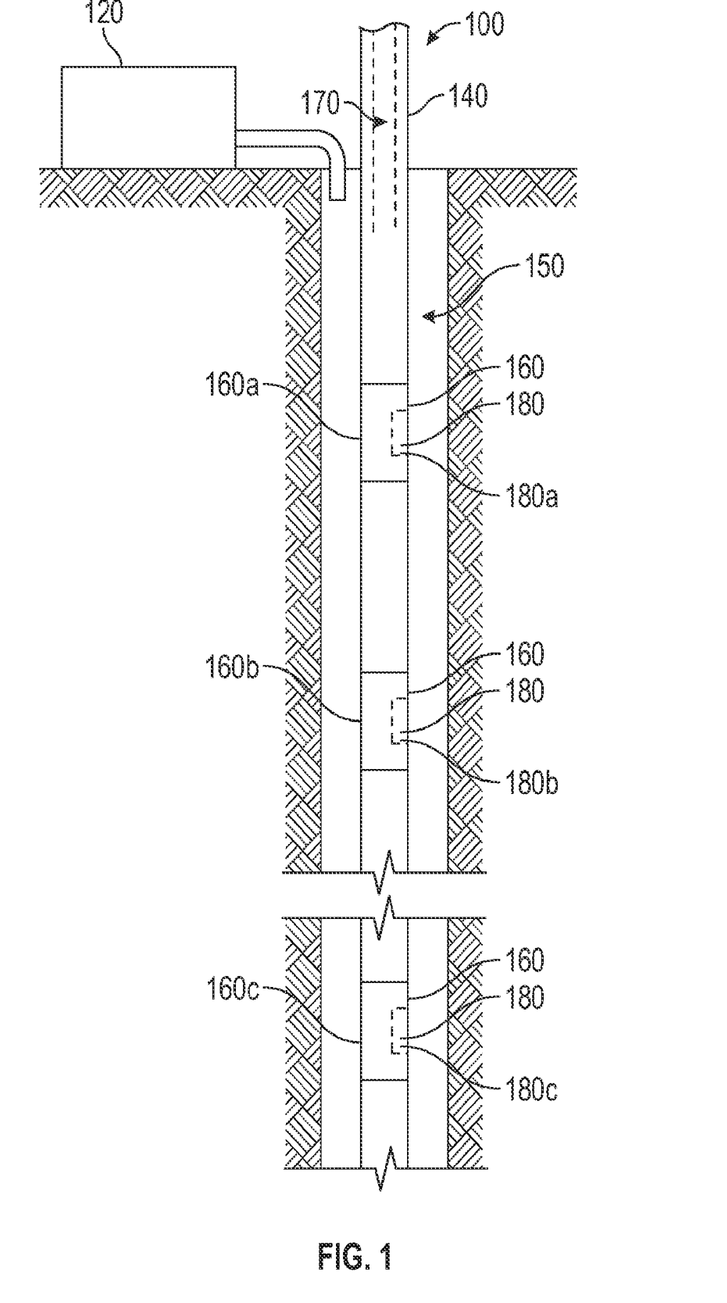
FIG. 1 shows a diagram of an example gas lift operation using improved gas lift valves.

FIG. 1 depicts a gas lift system 100 that includes a production tubing 140 that extends into a wellbore. For purposes of gas injection, the system 100 includes a gas compressor 120 that is located at the surface of the well to pressurize gas to be communicated to an annulus 150 of the well. To control the communication of gas between the annulus 150 and a central passageway 170 of the production tubing 140, the system 100 may include several side pocket gas lift mandrels 160 (example gas lift mandrels 160a, 160b and 160c). Each of the gas lift mandrels 160 includes an associated gas lift valve 180 (such as example gas lift valves 180a, 180b and 180c) for establishing one-way fluid communication from the annulus 150 to the central passageway 170. Near the surface of the well, one or more of the gas lift valves 180 may be unloading valves. An unloading gas lift valve opens when the annulus pressure exceeds the production tubing pressure by a certain threshold, a feature that aids in pressurizing the annulus below the valve before the valve opens. Other gas lift valves 180 are located farther below the surface of the well and may not have an opening pressure threshold.

Each gas lift valve 180 may contain a check valve element that opens to allow fluid flow (gas) from the annulus 150 into the production tubing 140 and closes when the fluid would otherwise back flow in the opposite direction. For example, the production tubing 140 may be pressurized for purposes of setting a packer, actuating a tool, performing a pressure test, and so forth. Thus, when the pressure in the production tubing 140 exceeds the annulus pressure, the valve element is closed to ideally form a seal to prevent flow from the tubing 140 to the annulus 150. However, it is possible that this seal may leak, and if leakage does occur, well operations that rely on production tubing pressure may not be able to be completed or performed. The leakage may require an intervention, which is costly, especially for a subsea well.

Figure 2:
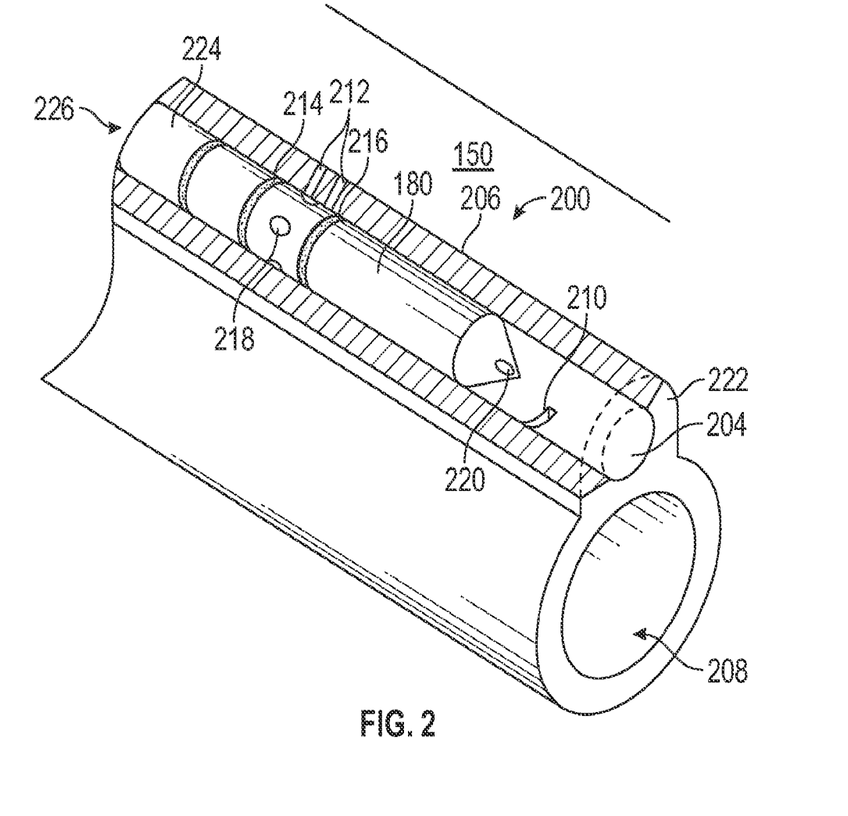
FIG. 2 shows an example gas lift valve assembly.

FIG. 2 shows a gas lift valve assembly 200 in accordance with some embodiments of the example gas lift valves. In general, the gas lift valve assembly 200 includes an example gas lift valve 180 that includes a valve element (described further below) to control fluid communication between the annulus 150 of the well and the central passageway 170 of the production tubing 140. The example gas lift valve 180 resides inside a longitudinal passageway 204 of a mandrel 206. In addition to the longitudinal passageway 204, the mandrel 206 includes a separate longitudinal passageway 208 that has a larger cross-section than passageway 204, is eccentric to passageway 204, and forms part of the production tubing string (140). As depicted in FIG. 2, the longitudinal passageways 204 and 208 are generally parallel to each other. The mandrel 206 includes at least one radial port 210 to establish communication between the longitudinal passageways 204 and 208 and also includes at least one radial port 212 to establish fluid communication between the longitudinal passageway 204 and the annulus 150 of the well that surrounds the mandrel 206.

In general, the gas lift valve 180 is configured to control fluid communication between the longitudinal passageway 208 and the annulus 150 of the well. In this regard, the gas lift valve 180 includes an upper seal 214 and a lower seal 216 (for example, o-ring seals, v-ring seals, or a combination) that circumscribe the outer surface housing of the example gas lift valve 180 to form a sealed region. The sealed region contains radial ports 218 of the example gas lift valve 180 and the radial ports 212 of the mandrel 206. One or more lower ports 220 (located near a lower end 222 of the longitudinal passageway 204) of the gas lift valve 180 are located below the lower seal 216 and are in fluid communication with the radial ports 210 near the lower end 222. The longitudinal passageway 204 is sealed off (not shown) to complete a pocket to receive the example gas lift valve 180. In this arrangement, the example gas lift valve 180 is positioned to control fluid communication between the radial ports 210 (i.e., the central passageway of the production tubing string 140) and radial ports 212 (of the mandrel 206, in fluid communication with the annulus 150). During operation, the example gas lift valve 180 establishes a one-way communication path from the annulus 150 to the central passageway 170 of the production tubing 140. Thus, when enabled, the gas lift valve 180 permits gas flow from the annulus 150 to the production tubing 140 and ideally prevents flow in the opposite direction.

The gas lift valve 180 may be installed or removed by a wireline operation in the well. Thus, in accordance with some embodiments, the example gas lift valve assembly 200 may include a latch 224 (located near an upper end 226 of the mandrel 206) that may be engaged with a wireline tool (not shown) for installing the example gas lift valve 180 in the mandrel 206 or removing the example gas lift valve 180 from the mandrel 206.

The example gas lift valve assembly 200 may be used in a subterranean well or in a subsea well, depending on a particular embodiment.

Figure 3:
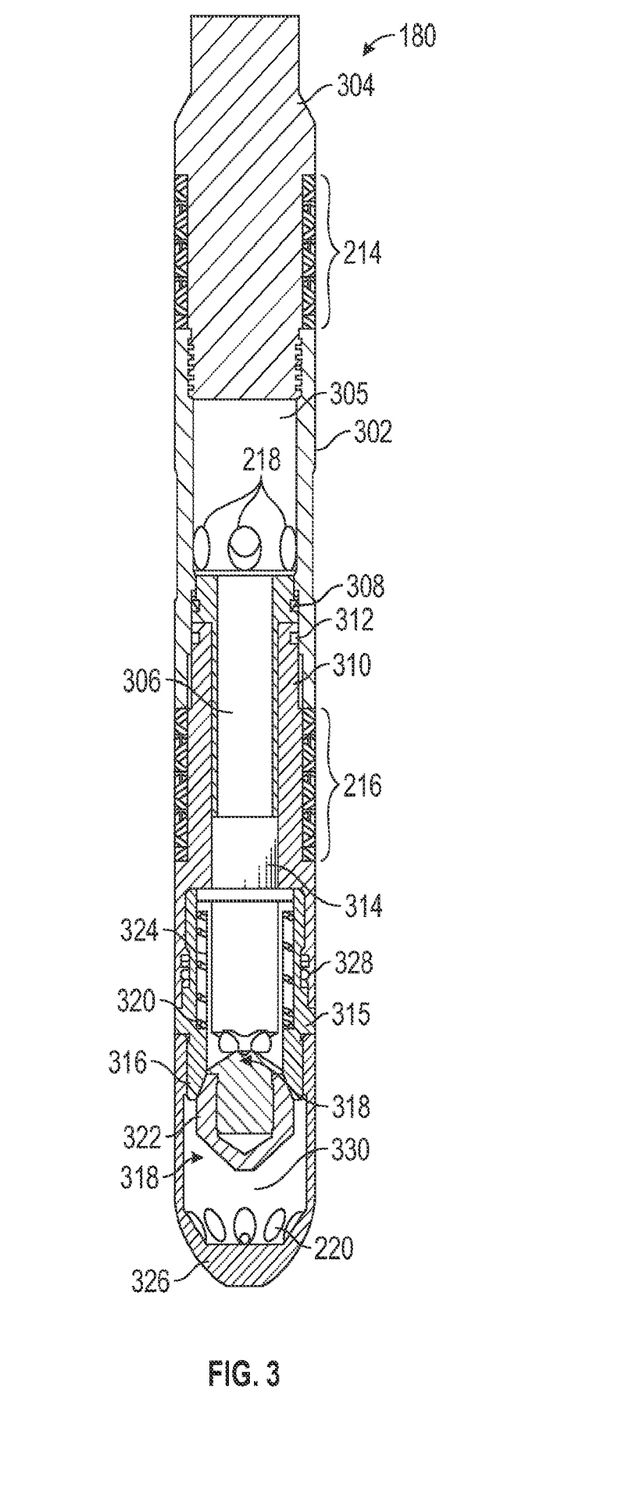
FIG. 3 shows an example gas lift valve in a closed position.

FIG. 3 shows an example gas lift valve 180 design. Radial ports 218 of the example gas lift valve 180 may be formed in a tubular housing 302 of the example gas lift valve 180. The tubular housing 302 may be connected to an upper concentric housing section 304 of the gas lift valve 180 that extends to the latch 224 (not shown in FIG. 3).

The housing 302 includes an interior space 305 for receiving gas that flows in from the radial ports 218. Injection gas that enters the radial ports 218 flows into the interior space 305 and through an orifice 306, which may be connected to the lower end of the housing 302. The orifice 306 may be cylindrical, square-edged, or streamlined for venture effects, for example. The housing around the orifice 306 may be partially circumscribed by the lower end of the housing 302 and may be sealed to the housing 302 with one or more seals 308, such as o-rings, for example. The housing of the orifice 306 may extend inside an upper end of a lower housing 310 that is concentric with the housing 302 and extends further downhole. The housings 310 and 302 may be sealed together via one or more seals 312, such as o-rings. As also depicted in FIG. 3, the lower seal 216 (formed from one or more v-type seals, o-rings, etc.) may circumscribe the outer surface of the housing 310 in some embodiments. The orifice 306 is in communication with a lower passageway 314 that extends through and/or within the housing 310.

In some configurations, the lower end of the housing 310 forms a valve seat 316, a seat that is opened and closed (for purposes of controlling the one-way flow through the gas lift valve 180) via a valve element 322 of a check valve assembly 318. The check valve assembly 318 may be spring-loaded using, for example, spring 320 in a guided spring assembly. The check valve assembly 318 may be anchored or secured via a socket-type connection to a moveable, sliding, hollow cylindrical member, such as a piston or barrel 324 surrounded by the inside diameter of coils of the spring 320. The check valve assembly 318 moves as a unit depending on the injected gas pressure, allowing pressurized gas to flow through the valve end of the barrel 324 in a controlled manner.

In some configurations, a poppet-shaped version of the valve element 322 ("poppet valve element" 322) allows gas flow, or closes off gas flow as the case may be, controlling fluid communication through the valve seat 316. The check valve assembly 318 exerts an "upward" bias force (towards the surface, i.e., toward closure of the example gas lift valve 180 against back pressure) on the valve element 322 for biasing the valve element 322 to close off fluid communication through the valve seat 316.

The particular mushroom-like geometry of a poppet-shaped disk, when used as the valve element 322, provides a concerted valve closure all the way around the sealing perimeter of the poppet valve element 322 when the poppet valve element 322 shuts during pressure scenarios that would cause backflow. In an implementation, a one-piece poppet valve element 322 ensures alignment of the sealing surface when it closes.

Besides this consistent evenness of the closing seal due to the poppet geometry, the poppet valve element 322 also provides reliability in the seal that is created between the poppet valve element 322 and the valve seat 316. The poppet-shaped valve element 322, as guided by the piston or barrel 324 that supports the spring 320, moves smoothly and reliably in one axial direction for opening and closing. The relatively large bore of the barrel 324 located just inside the coils of the spring 320 provides strength and smoothness to the axial movement of the poppet valve element 322, and removes unnecessary play, as compared with conventional back check valves that use a spindly support member for movement of a conventional valve element.

In some configurations, the cross-sectional diameter of the barrel 324 may be substantially the same diameter as that of the poppet valve element 322 to maintain a sealing surface of the poppet valve element 322 in good or perfect parallel-planar alignment with a sealing surface of the valve seat 316. Thus, the geometry of the check valve assembly 318 affords the poppet valve element 322 reliable and smooth movement, so that the poppet valve element 322 makes a consistent leak-proof seal. Thus, the poppet valve element 322 snaps shut against the valve seat 316 in consistent alignment making a quick and reliable seal when the pressure in the production tubing 140 becomes greater than the pressure in the annulus 150.

When, however, the annulus pressure is sufficient (relative to the production tubing pressure) to exert a force on the poppet valve element 322 to overcome the bias of the spring 320, then the poppet valve element 322 retracts (opens downward) to permit gas fluid to flow from the annulus 150 into the production tubing 140 to effect gas lift.

The lower end of the lower housing 310 may be sealed via an o-ring 328 for example, to a nose housing or end housing 326 that extends further downward toward the lower port(s) 220 of the example gas lift valve 180. An interior space 330 inside the end housing 326 is in communication with the production tubing side (140 and 170) of the example gas lift valve 180 and receives the injected gas via the annulus 150 that opens the check valve assembly 318 and flows through the valve seat 316.

A gas lift valve 180 including the poppet valve element 322 provides several advantages. A wide spring 320 can be used and the inside diameter (ID) of the spring 320 can be disposed around and guided by the piston or barrel 324, as shown. This arrangement provides steady and reliable movement of the poppet valve element 322 as compared with conventional spring-loaded valve elements that either rely on an unsupported spring or rely on a narrow spring that imparts too much play in the side-to-side movement of a conventional valve element. In FIG. 3, the spring 320 is also protected from the flow stream, adding to longevity and reliable function of the spring 320. The design and geometry of the example gas lift valve 180 also avoids direct high speed flow past the sealing surface, which can provide a valve closure for preventing backflow that is more sensitive to smaller backflow pressures. In an implementation, the movement of the open poppet valve element 322 is stopped by the poppet valve element 322 itself contacting the nose housing or end housing 326 of the example gas lift valve 180, as compared with conventional techniques of having movement limited by other components attached to a valve element, which could cause the valve element to stick at an open position. In other configurations, the movement of the open poppet valve element 322 can be stopped by a maximum compression of the spring 320, a shoulder of the barrel 324 contacting a lip or shoulder on the body or another component of the valve, or other mechanisms.

Ideally, fluid cannot flow from the production tubing side of the check valve assembly 318 to the annulus side, because of the poppet valve element 322 closing and making a seal against the valve seat 316.

Figure 4:
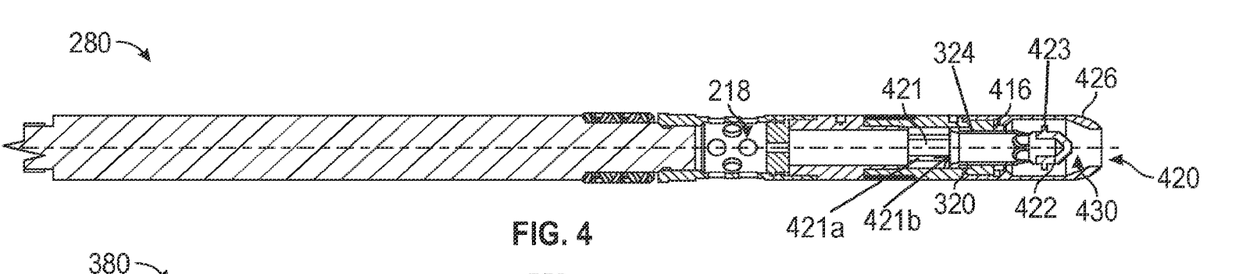
FIG. 4 shows an example scale-resistant gas lift valve in an open position.

FIG. 4 illustrates an example gas lift valve 280 having scale-resistant features. The illustrated gas lift valve 280 is similar in some ways to and shares some features with the gas lift valve 180 illustrated in FIG. 3. For example, gas lift valve 280 includes a valve element 422, which may be poppet-shaped. Alignment features 421 and spring 320, which can be disposed about barrel 324, are positioned above the sealing surface of the valve seat 416. The alignment features 421 can advantageously help maintain a sealing surface of the valve element 422 in alignment with a sealing surface of the valve seat. In the illustrated configuration, the alignment features 421 are or include a hexagonal peg 421a in a hexagonal hole 421b. For example, an inner surface of the barrel 324 can have a hexagonal cross-section. FIG. 4 shows the valve 280 in an open position. When the valve 280 moves toward a closed position, the valve element 422 and barrel 324 can be moved upward (toward the left side of FIG. 4), for example by the return or bias force of the spring 320. The hexagonal internal cross-section 421b of the barrel 324 can slide about and along a hexagonal outer cross-section of the peg 421a. The hexagonal alignment features 421 can advantageously help inhibit or prevent rotation of the barrel 324 and/or valve element 422 as the barrel 324 and valve element 422 move axially during opening and closing of the valve.

With the alignment features 421 and spring 320 above the sealing surface, when the valve element 422 is closed, downhole or production fluid does not contact the alignment features 421 or spring 320. Therefore, growth of scale on those features is reduced, inhibited, or prevented. In some configurations, the sealing surface is or includes a soft seal or sealing surface. In some configurations, the valve element 422 includes a radially outwardly protruding flange or shoulder 423. The flange or shoulder 423 can seal against the valve seat 416.

The gas lift valve 280 of FIG. 4 has a single outlet hole 420 instead of a collection of smaller outlet holes or lower ports 220 as in the embodiment illustrated in FIG. 3. Use of one larger hole compared to multiple smaller holes can reduce the likelihood of the outlet becoming plugged. Surfaces exposed to well fluid, such as the outlet hole 420, can have radialized edges. Removing sharp edges can reduce scale nucleation sites. In some configurations, such as shown in FIG. 4, the nose housing 426 is elongated, for example, compared to the nose housing 326 of the gas lift valve illustrated in FIG. 3. The elongated nose housing 426 increases the size of the gas pocket or interior space 430 within the nose housing 426 and backcheck subassembly, thereby advantageously helping isolate the sealing surface from downhole or production fluids.

Figure 5:
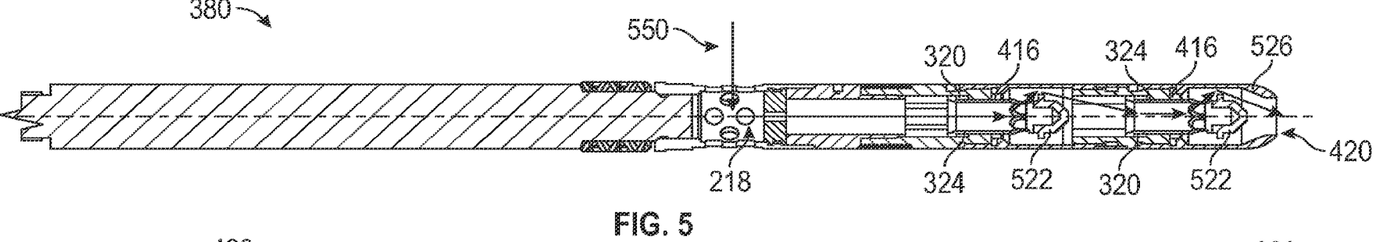
FIG. 5 shows an example scale-resistant gas lift valve in an open position.

FIG. 5 illustrates another example gas lift valve 380 having scale-resistant features. The illustrated gas lift valve 380 is similar in some ways to and shares some features with the gas lift valve 180 illustrated in FIG. 3 and the gas lift valve 280 illustrated in FIG. 4. The gas lift valve 380 includes two valve element assemblies in series. Each valve element assembly includes a valve seat 416 and a check valve assembly including a valve element 522. Each valve element assembly can also include a biasing member, e.g., a spring 320, and a piston or barrel 324. The valve elements 522 can be poppet-shaped as shown. During injection, when injection pressure is greater than pressure in the production tubing, the two valve elements 522 open. Injection fluid flows in through radial ports 218, past the upstream valve element 522 (the valve element 522 on the left of FIG. 5), past the downstream valve element 522 (the valve element 522 on the right of FIG. 5), and out through one or more outlet holes (outlet hole 420 in the illustrated configuration of FIG. 5), for example, along the flow path indicated by arrows 550 in FIG. 5. When injection stops, the downstream valve element 522 (the valve element 522 on the right of FIG. 5, and the valve element 522 downstream with respect to the flow of injection fluid or gas from the surface) closes, advantageously protecting the upstream valve element (the valve element 522 on the left of FIG. 5) from downstream or production fluids. The nose housing 526 of gas lift valve 380 can include any or all of the features of nose housing 426 of the gas lift valve 280 of FIG. 4.

Figure 6:
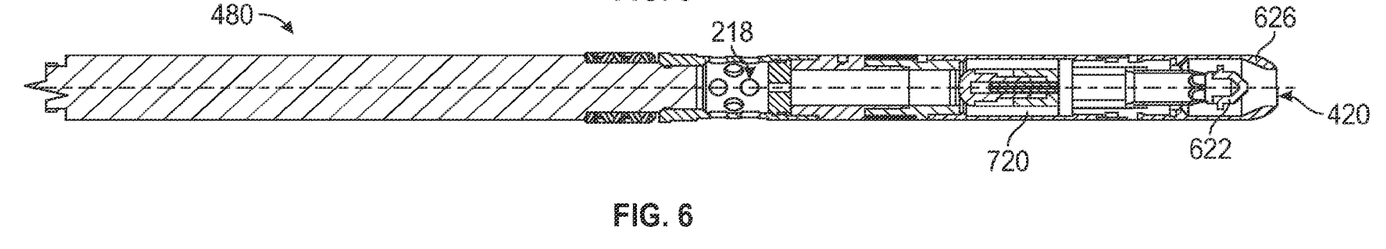
FIG. 6 shows an example scale-resistant gas lift valve in an open position.

FIG. 6 illustrates another example gas lift valve 480 having scale-resistant features. The gas lift valve 480 includes two valve element assemblies in series. The downstream (with respect to the flow of injection fluid or gas) valve element assembly includes a poppet-shaped valve element 622 and includes any or all of the features of the valve element assemblies of gas lift valves 380, 280, and 180. Gas lift valve 480 can also include a nose housing 626 and/or outlet 420 that is similar to or the same as those of gas lift valves 380 and 280. In the illustrated configuration, the upstream valve element assembly is a dual radius check or dart 720.

In some configurations, a gas lift valve according to or including features according to the present disclosure (e.g., gas lift valves 180, 280, 380, 480), or one or more components of such a gas lift valve, can include a coating selected, designed, and/or applied to inhibit or reduce the likelihood of scale adhesion and/or to improve scale removal. In some configurations, the coating(s) can be or include Teflon-based coating(s) and/or diamond-like coating(s).

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and/or within less than 0.01% of the stated amount. As another example, in certain embodiments, the terms "generally parallel" and "substantially parallel" or "generally perpendicular" and "substantially perpendicular" refer to a value, amount, or characteristic that departs from exactly parallel or perpendicular, respectively, by less than or equal to 15 degrees, 10 degrees, 5 degrees, 3 degrees, 1 degree, or 0.1 degree.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. It is also contemplated that various combinations or sub-combinations of the specific features and aspects of the embodiments described may be made and still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above.

What is claimed is:

1. A gas lift valve, comprising:
    a first port for receiving a gas from a well annulus;
    a second port for transferring the gas to a well production tube;
    a valve seat;
    a poppet valve element for allowing a one-way flow of the gas past the valve seat and for preventing a back flow of the gas, wherein a maximum open state of the poppet valve element is determined by the poppet valve element contacting an end housing of the gas lift valve;
    a sliding barrel attached to the poppet valve element to maintain a sealing surface of the poppet valve element in alignment with a sealing surface of the valve seat; and
    a spring coiled around the outside diameter of the sliding barrel to bias the poppet valve element in a closed position against the valve seat.

2. The gas lift valve of claim 1, wherein the sliding barrel and the spring have a wide cross-sectional diameter substantially the same as a diameter of the poppet valve element to maintain a sealing interface of the poppet valve element and the valve seat in parallel-planar alignment with each other.

3. The gas lift valve of claim 1, wherein the poppet valve element comprises a one-piece member for alignment of the sealing surface of the poppet valve element with the sealing surface of the valve seat.

4. The gas lift valve of claim 1, wherein the spring is protected from a main flow of the gas by the sliding barrel.

5. The gas lift valve of claim 1, wherein a sealing interface between the poppet valve element and the valve seat is protected from a direct high speed flow of the gas by at least one valve component.

6. The gas lift valve of claim 1, further comprising a second valve seat, a second poppet valve element, a second sliding barrel, and a second spring.

7. The gas lift valve of claim 1, further comprising a dual radius check positioned in the gas lift valve upstream of the valve seat and the poppet valve element.

8. The gas lift valve of claim 1, further comprising a scale-resistant coating.

9. The gas lift valve of claim 1, wherein the second port comprises a single outlet hole.

10. The gas lift valve of claim 9, wherein the single outlet hole comprises radialized edges configured to reduce scale nucleation sites and reduce the likelihood of the second port becoming plugged.

11. A scale resistant gas lift valve, comprising:
    a first port for receiving a gas from a well annulus;
    a second port for transferring the gas to a well production tube, the second port comprising a single outlet hole;
    a valve seat;
    a poppet valve element for allowing a one-way flow of the gas past the valve seat and for preventing a back flow of the gas;
    alignment features configured to maintain a sealing surface of the poppet valve element in alignment with a sealing surface of the valve seat, wherein the alignment features comprise a peg having a hexagonal outer cross-sectional shape and a hole having a corresponding hexagonal inner cross-sectional shape, the peg configured to slide within and relative to the hole as the gas lift valve opens and closes in use;
    a sliding barrel attached to the poppet valve element; and
    a spring coiled around an outside diameter of the sliding barrel to bias the poppet valve element in a closed position against the valve seat.

12. The scale resistant gas lift valve of claim 11, wherein the alignment features and the spring are positioned above the sealing surface of the valve seat.

13. The scale resistant gas lift valve of claim 11, wherein the single outlet hole comprises radialized edges configured to reduce scale nucleation sites and reduce the likelihood of the second port becoming plugged.

14. The scale resistant gas lift valve of claim 11, further comprising a second valve seat, a second poppet valve element, a second sliding barrel, and a second spring disposed upstream, relative to a flow of an injection fluid or the gas from the well annulus through the scale resistant gas lift valve to the well production tube, of the valve seat, the poppet valve element, the sliding barrel, and the spring.

15. The scale resistant gas lift valve of claim 11, further comprising a dual radius check positioned in the scale resistant gas lift valve upstream, relative to a flow of an injection fluid or the gas through the scale resistant gas lift valve from the well annulus to the well production tube, of the valve seat and the poppet valve element.

16. The scale resistant gas lift valve of claim 11, further comprising a scale-resistant coating.

17. The scale resistant gas lift valve of claim 16, wherein the coating is Teflon-based or diamond-like.

18. A gas lift valve, comprising:
    a first port for receiving a gas from a well annulus;
    a second port for transferring the gas to a well production tube;
    a valve seat;
    a poppet valve element for allowing a one-way flow of the gas past the valve seat and for preventing a back flow of the gas;
    a dual radius check positioned in the gas lift valve upstream of the valve seat and the poppet valve element;
    a sliding barrel attached to the poppet valve element to maintain a sealing surface of the poppet valve element in alignment with a sealing surface of the valve seat; and
    a spring coiled around the outside diameter of the sliding barrel to bias the poppet valve element in a closed position against the valve seat.

19. The gas lift valve of claim 18, further comprising a scale-resistant coating.

20. The gas lift valve of claim 18, the second port comprising a single outlet hole.

\* \* \* \* \*